United States Patent [19]
Schwarz

[11] 3,902,230
[45] Sept. 2, 1975

[54] SIMULTANEOUS CONTINUOUS BIAXIAL WEB STRETCHER

[75] Inventor: Eckhard C. A. Schwarz, Neenah, Wis.

[73] Assignee: Kimberly-Clark Corporation, Neenah, Wis.

[22] Filed: July 1, 1974

[21] Appl. No.: 484,410

Related U.S. Application Data

[62] Division of Ser. No. 263,417, June 16, 1972, Pat. No. 3,833,973.

[52] U.S. Cl. .................................................. 26/59
[51] Int. Cl.² ........................................... D06C 3/00
[58] Field of Search ............. 26/58, 59, 64; 264/289

[56] References Cited
UNITED STATES PATENTS

| | | | |
|---|---|---|---|
| 49,947 | 9/1865 | Bennett | 26/59 |
| 2,571,355 | 10/1951 | Gardner | 26/58 UX |
| 3,247,544 | 4/1966 | Bromley | 264/289 X |
| 3,445,886 | 5/1969 | LeMoine et al. | 26/59 X |

*Primary Examiner*—Robert R. Mackey
*Attorney, Agent, or Firm*—Daniel J. Hanlon, Jr.; William D. Herrick; Raymond J. Miller

[57] ABSTRACT

Apparatus for achieving simultaneous, continuous, biaxial orientation of webs including means for feeding the web to clamps positioned about a pair of oppositely canted sheaves, moving the clamped web around the circumference of the sheaves, and removing the biaxially stretched web from the sheaves at a location of wider separation than the feed zone. In one embodiment the clamps are driven by rods rotating parallel to the plane of the sheaves, but about a center which is displaced from that of the sheaves to obtain nearly balanced stretch profiles. Completely balanced stretch is achieved by using slightly s-shaped rods. The clamps accelerate with the web on one semicircle and decelerate on the opposite semicircle. Acceleration provides longitudinal stretching, while the divergence of the sheave circumferences provides lateral stretching.

4 Claims, 8 Drawing Figures

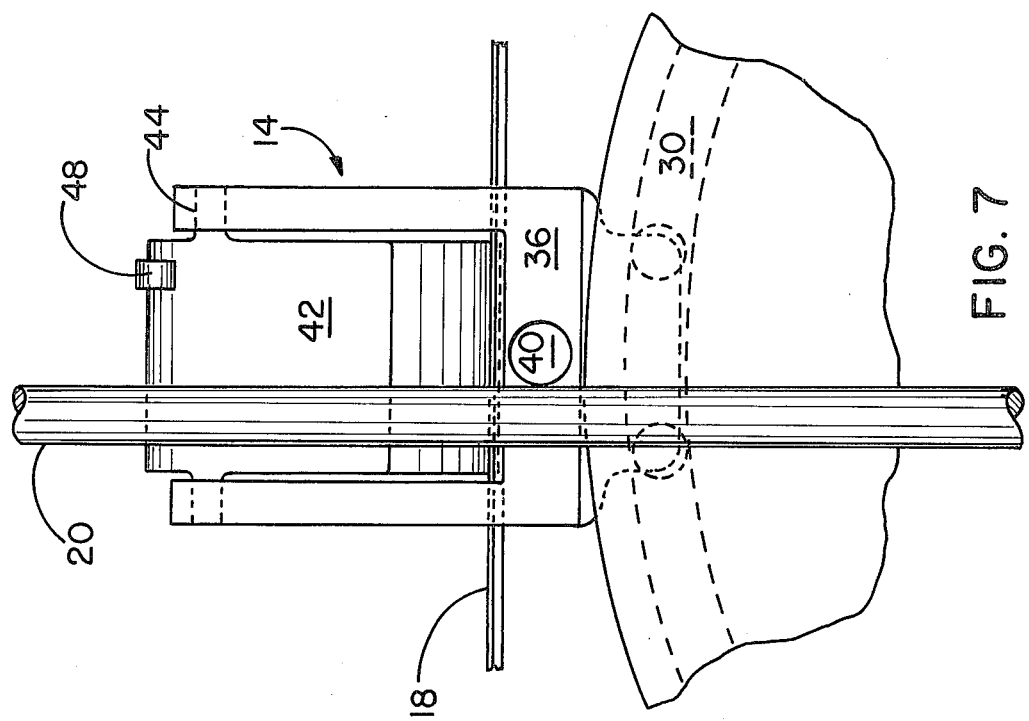
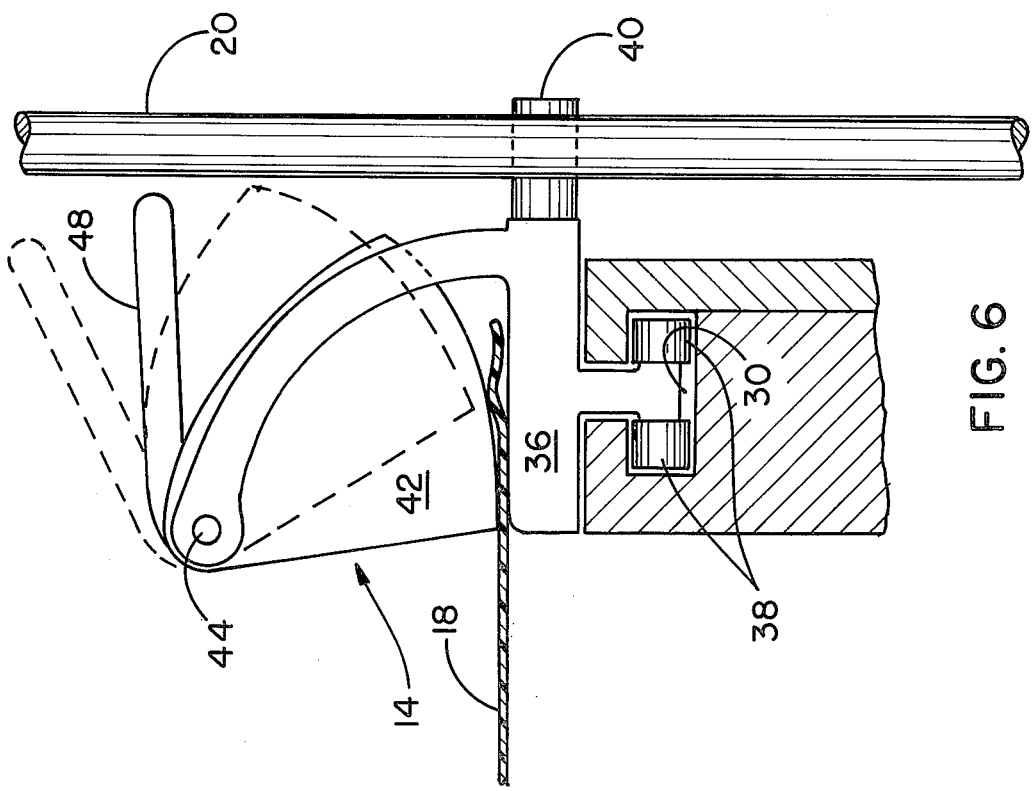
FIG. 7
FIG. 6

SIMULTANEOUS CONTINUOUS BIAXIAL WEB STRETCHER

This is a division of application Ser. No. 263,417 filed June 16, 1972, now U.S. Pat. No. 3,833,973 granted Sept. 10, 1974.

BACKGROUND OF THE INVENTION

1. Field of the Invention

This invention is related generally to apparatus for stretching webs or sheets. More particularly, the invention relates to such apparatus that are capable of achieving desired stretching in both longitudinal and lateral directions. Specifically, the present invention provides apparatus for continuously and simultaneously biaxially orienting or stretching webs or sheet material.

2. Prior Art

In order to impart improved strength to polymeric film materials such as polystyrene or polypropylene, for example, these films are biaxially oriented or stretched. Conventional processes usually stretch these films first longitudinally over roll systems then laterally in a "tenter-frame"; the stretching, therefore, takes place sequentially. It is well known in the art that most films which are stretched biaxially simultaneously have different and improved properties when compared with those where the stretching processes took place separately. Simultaneous biaxial stretchers which operate in a batchwise fashion have been known for some time. Furthermore, some simultaneous biaxial stretchers which operate continuously by having tenter-frame clamps that accelerate during the lateral stretching are also known and disclosed for example in U.S. Pat. No. 3,445,887. In these devices, however, the clamp acceleration mechanism is complicated and has been known to require frequent repair. For example the clamps usually must be removed from the rails, transferred to a separate track, and then reattached to the acceleration mechanism. Also, adjustments in the stretch profile with such apparatus are difficult to make.

SUMMARY OF THE INVENTION

Briefly, in accordance with the present invention, the continuous simultaneous biaxial stretcher includes a pair of sheaves that are oppositely canted so that they approach each other at one location and are divergent at the opposite points on the sheaves. The web is fed so that its edges are engaged by clamps on the circumference of these sheaves at a location of relatively narrow separation, and moves between the circumference of the sheaves, generally in a semicircle to the point of widest separation. The clamps are accelerated along the semicircle path by rods or the like rotating parallel to the plane of the sheave but around a center which is offset from that of the sheaves, lying between the center of the sheaves and the location of closest distance between the sheaves. Both longitudinal and lateral stretch are simultaneously obtained. The web is then removed from the sheaves and clamps after about a semicircle and at a location of wider separation between the sheaves than the feed zone. The result is a web which has undergone stretch in a nearly balanced sinusoidal biaxial stretch profile. It may be made completely balanced in a preferred embodiment by positioning the clamps on rods which pivot about the displaced axis and have a slightly s-shaped configuration. The method and apparatus thus have utility in stretching not only films and webs of a polymeric nature but any materials capable of biaxial orientation and being capable of being gripped by the clamps.

BRIEF DESCRIPTION OF THE DRAWINGS

FIGS. 6 and 7 illustrate the clamping mechanism; and

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications, and equivalents as may be included in the spirit and broad scope of the invention as defined by the appended claims.

As used in describing this invention the term "web" will be used when referring to the material being stretched. It will be recognized by those skilled in this art that the particular material is not critical to the invention; therefore, the term "web" is intended to include films, sheets, and other thin structures which can be stretched.

Figure 1:
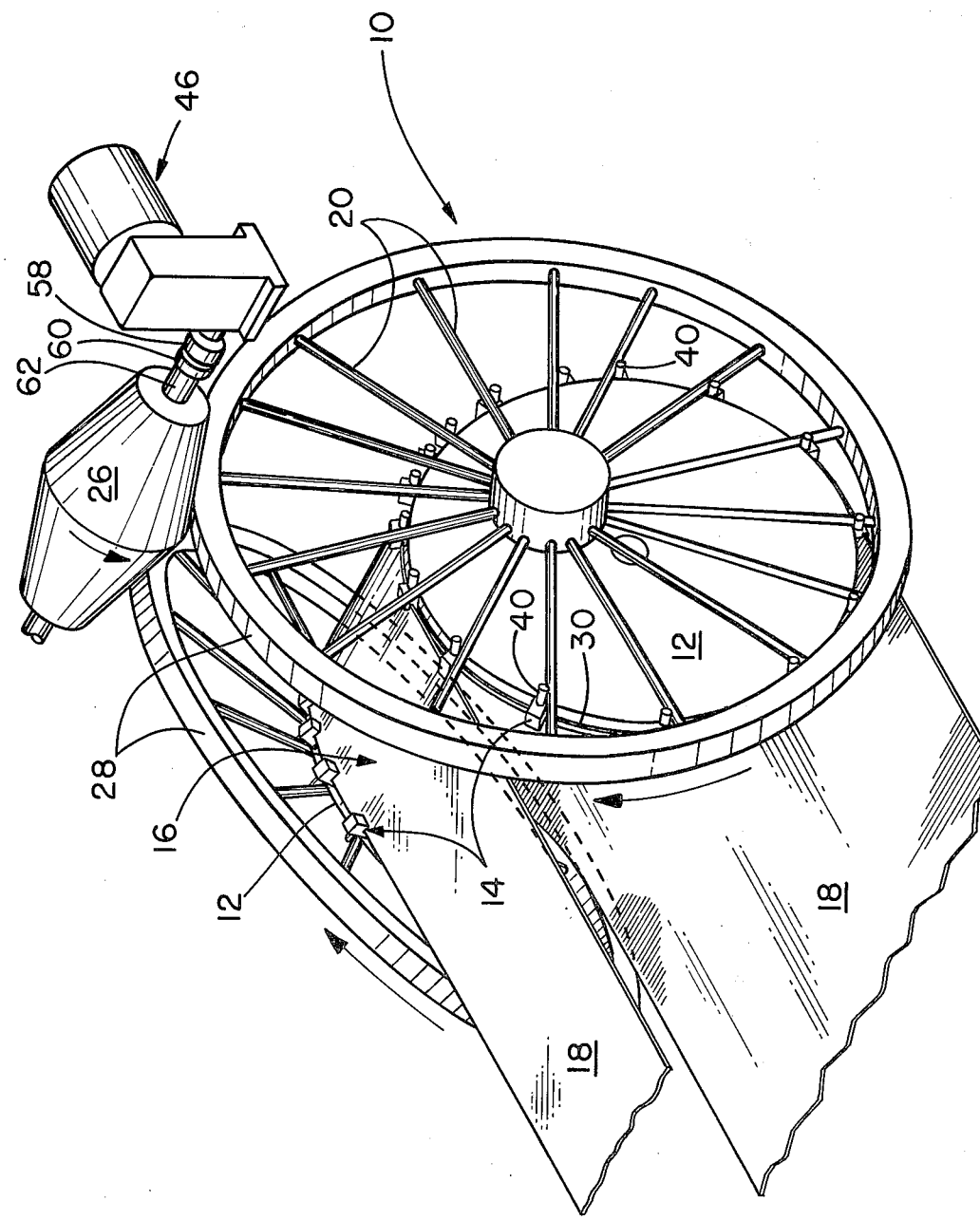
FIG. 1 is an overall perspective schematic view of apparatus constructed in accordance with the invention.
Figure 2:
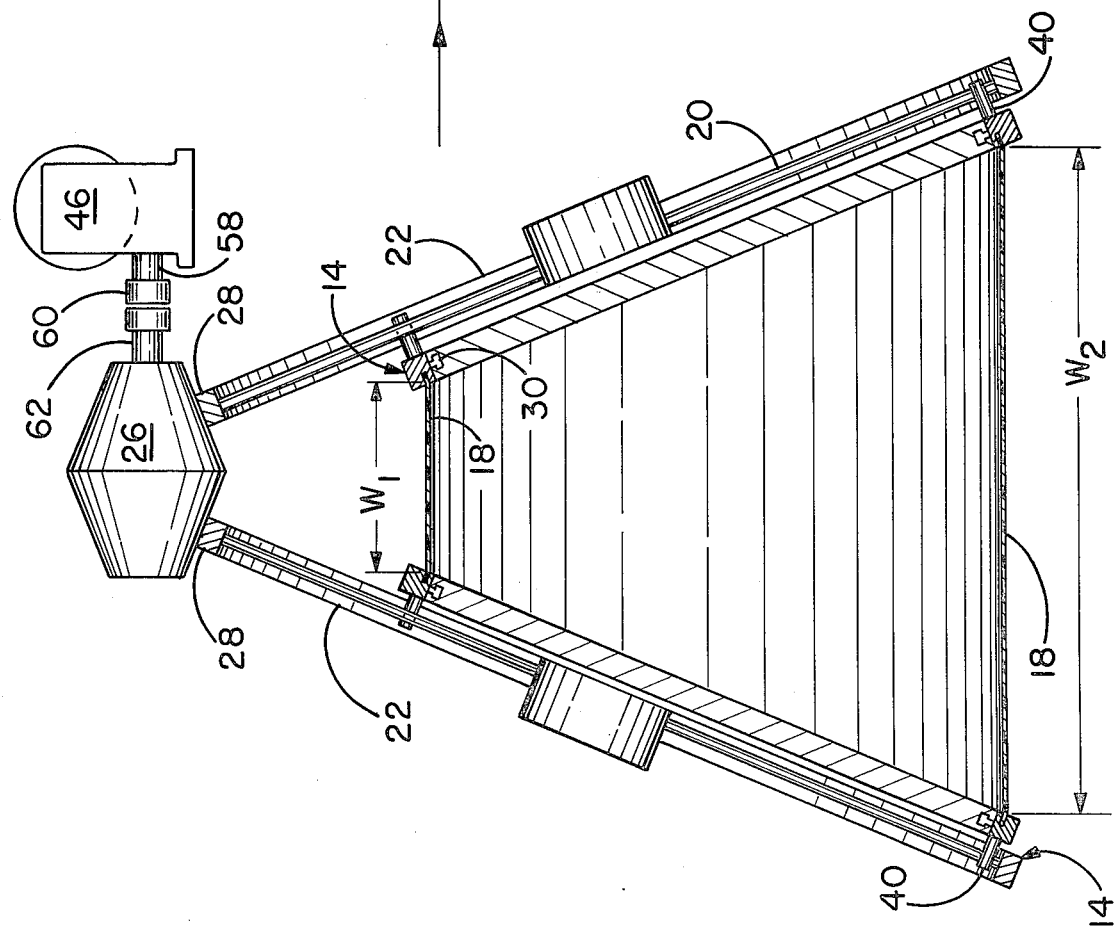
FIG. 2 is a sectional view of the apparatus of FIG 1.

Turning first to FIG. 1, there is shown in perspective view an embodiment of the apparatus of the present invention generally indicated as 10. Included are sheaves 12 fixed side by side and canted at an angle alpha (FIG. 2). It is only critical that circumferential paths be provided for the clamps in canted planes, so the sheaves may be replaced by a solid or hollow cylinder having ends in the desired planes. In some cases it may be desirable to perform the stretching under controlled temperature conditions, and the cylinder may be appropriately equipped with heating or cooling systems (FIG. 8) for that purpose.

Clamps 14 at the narrower area 16 receive and grip web 18. These clamps 14 are movably engaged with circumferential track 30 (FIGS. 6 and 7) and also slidably engaged to rods 20 which are driven in constant angular velocity about pivots which are displaced from the geometric center of sheaves 12, by constant drive means 26 connected to a power source, indicated generally as 46 having drive shaft 58 and coupling 60 for drive roll shaft 62.

Figure 3:
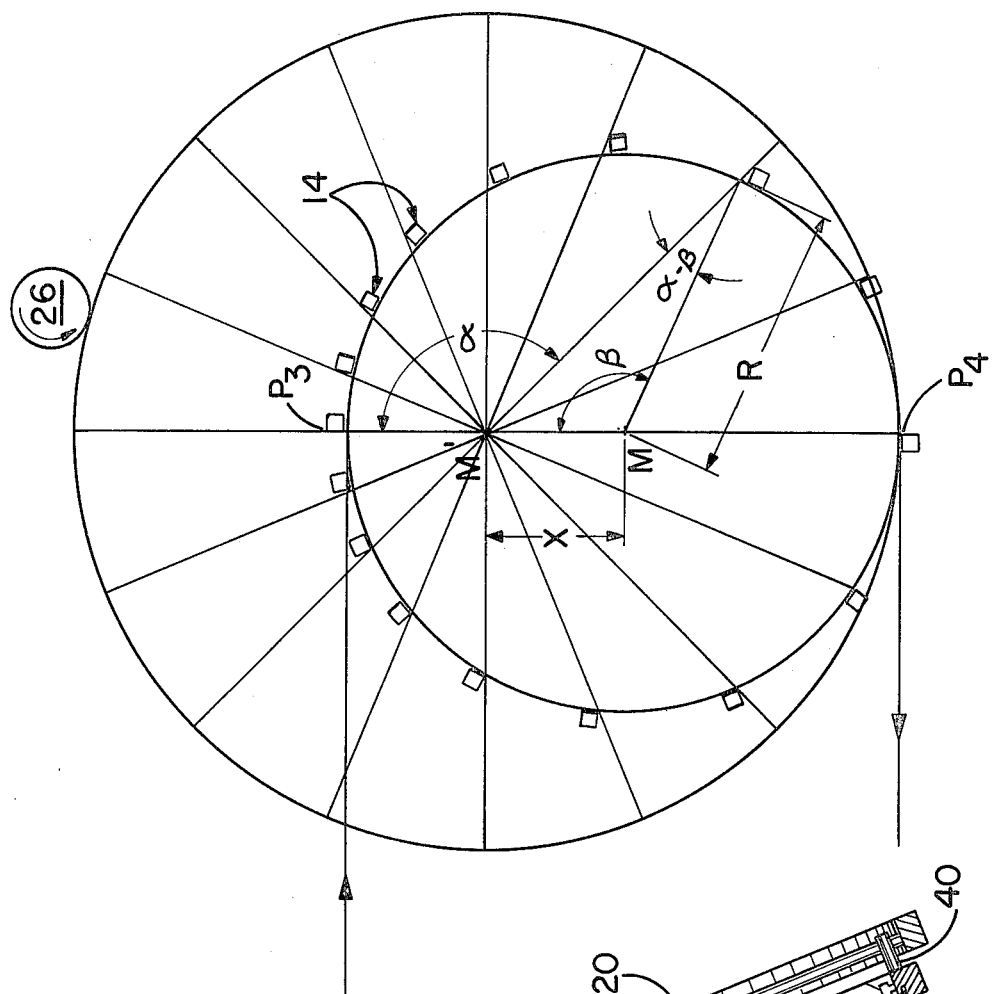
FIG. 3 is a diagrammatic illustration showing the operation of the apparatus illustrated in FIG. 1.

Turning now to FIGS. 2 and 3, it will be apparent that as the web 18 is gripped and moved with clamps 14, it will be stretched laterally from a width $W_1$ to a width $W_2$, a lateral draw ratio of $W_2/W_1$. Furthermore, as a clamp moves from $P_3$ to $P_4$, it is constantly being accelerated since the angular velocity around the track circle $d\beta/dt$ changes. As shown in FIG. 3 the relationship is as follows where a is defined as $x/R$, $x$ is the radial displacement of M, the sheave center, from $M^1$; the center about which drive rods 20 rotate, and R is the sheave radius: $\sin(\alpha - \beta) = a \cdot \sin\alpha$.

The longitudinal draw ratio at any point P is then:

$$\frac{\frac{d\beta}{d\alpha_p}}{\frac{d\beta}{d\alpha_o}}$$

where $\alpha_p = \alpha$ at point P  $\alpha_o = \alpha$ at $0°$
From the first equation $$\frac{d\beta}{d\alpha} = \frac{(\cos\beta - a)^2 + \sin^2\beta}{1 - a \cdot \cos\beta}$$

The maximum longitudinal draw ratio is then:

$$\frac{\frac{d\beta}{d\alpha_{180}}}{\frac{d\beta}{d\alpha_o}} = \frac{1+a}{1-a}$$

where $\alpha_{180} = \alpha$ for $180°$. The longitudinal stretch, thus, can be controlled by varying the displacement distance, $x$.

Figure 4:
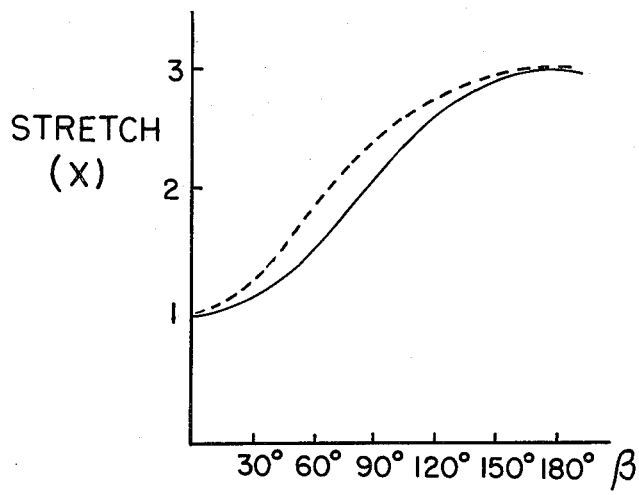
FIG. 4 is a graph showing an example of the longitudinal and lateral stretch profile obtained in accordance with the present invention.

Returning to FIGS. 1 and 2, the combined operation to produce simultaneous lateral and longitudinal stretch will be described. Drive roll 26 causes rods 20 to rotate about their pivots by contact with rims 28 which may, for that purpose, be provided with intermesh gearing or a friction surface (not shown). Clamps 14 thus progressively move laterally due to the divergence of sheaves 12 and also accelerate longitudinally due to the angular rotation of rods 20. This simultaneous lateral and longitudinal stretching occurs for a full 180° around sheaves 12. FIG. 4 is a typical longitudinal and lateral stretch profile obtained with the apparatus of the present invention showing degree of stretch ($x$) plotted against angular travel. It can be seen that the lateral stretch profile is sinusoidal while the longitudinal stretch profile is nearly sinusoidal. The longitudinal draw is thus slightly ahead of the lateral draw through most of the 180°. The biaxial stretch ratio, although "balanced" at the end of the process, is not balanced at all times during the process. The rods 20 may be replaced by a solid wheel, for example, having tracks mounted on it to provide the desired clamp movement.

Figure 5:
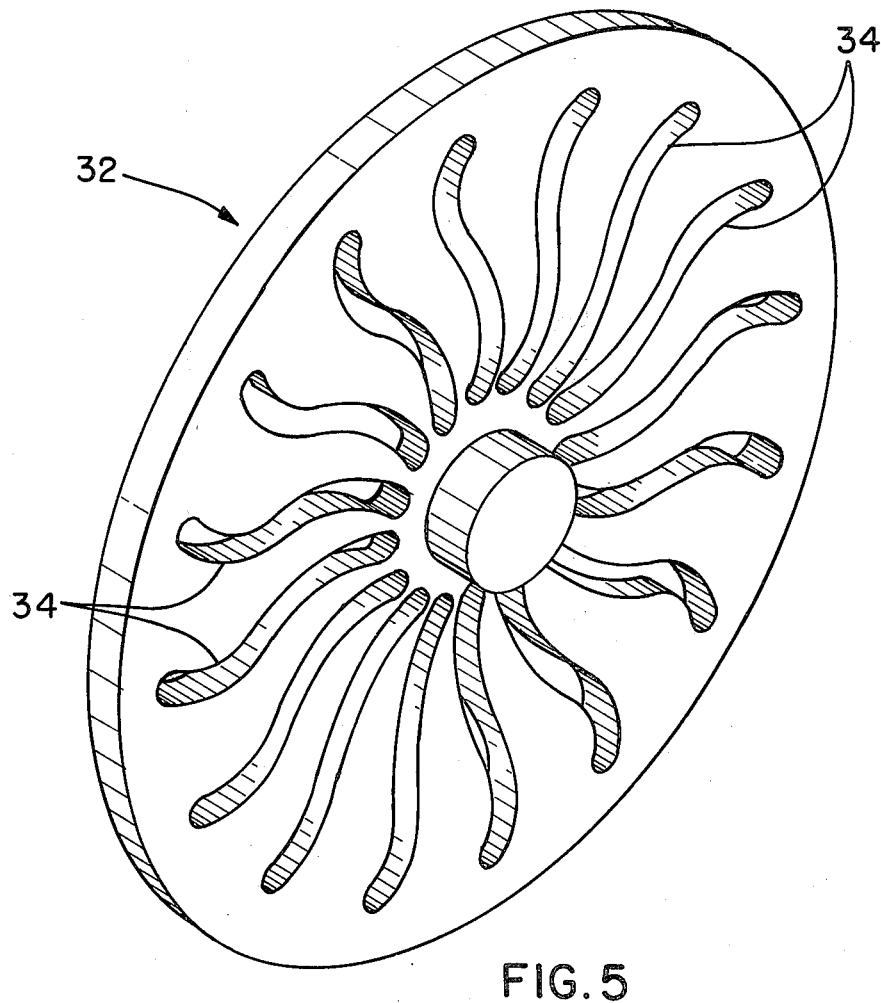
FIG. 5 is a perspective view of an alternative clamp drive mechanism.

FIG. 5 illustrates a disk 32 which can replace rods 20 for such an embodiment. The exact shape of guide slots 34 will depend on the particular web being stretched but, in most cases, a very slight s-shape will be sufficient for improved stretch balance.

FIGS. 6 and 7 illustrate an example of a clamping device which may be utilized. Clamps for stretching films and other webs are known, and many of those in general use may be adapted for use with the present invention. As illustrated, however, clamp 14 includes support plate 36 which is adapted to move circumferentially around sheave 12 in track 30 as by means of rollers 38. Bar 40 contacts rod 20 and is free to slide along its length and be driven in rotation by contact with it. Wedge 42 pivots about pin 44 to maintain the web 18 in place by forcing it against support plate 36. Release of web 18 is accomplished by pivoting wedge 32 into an upward position (FIG. 6) through the use of handle 48, for example.

Figure 8:
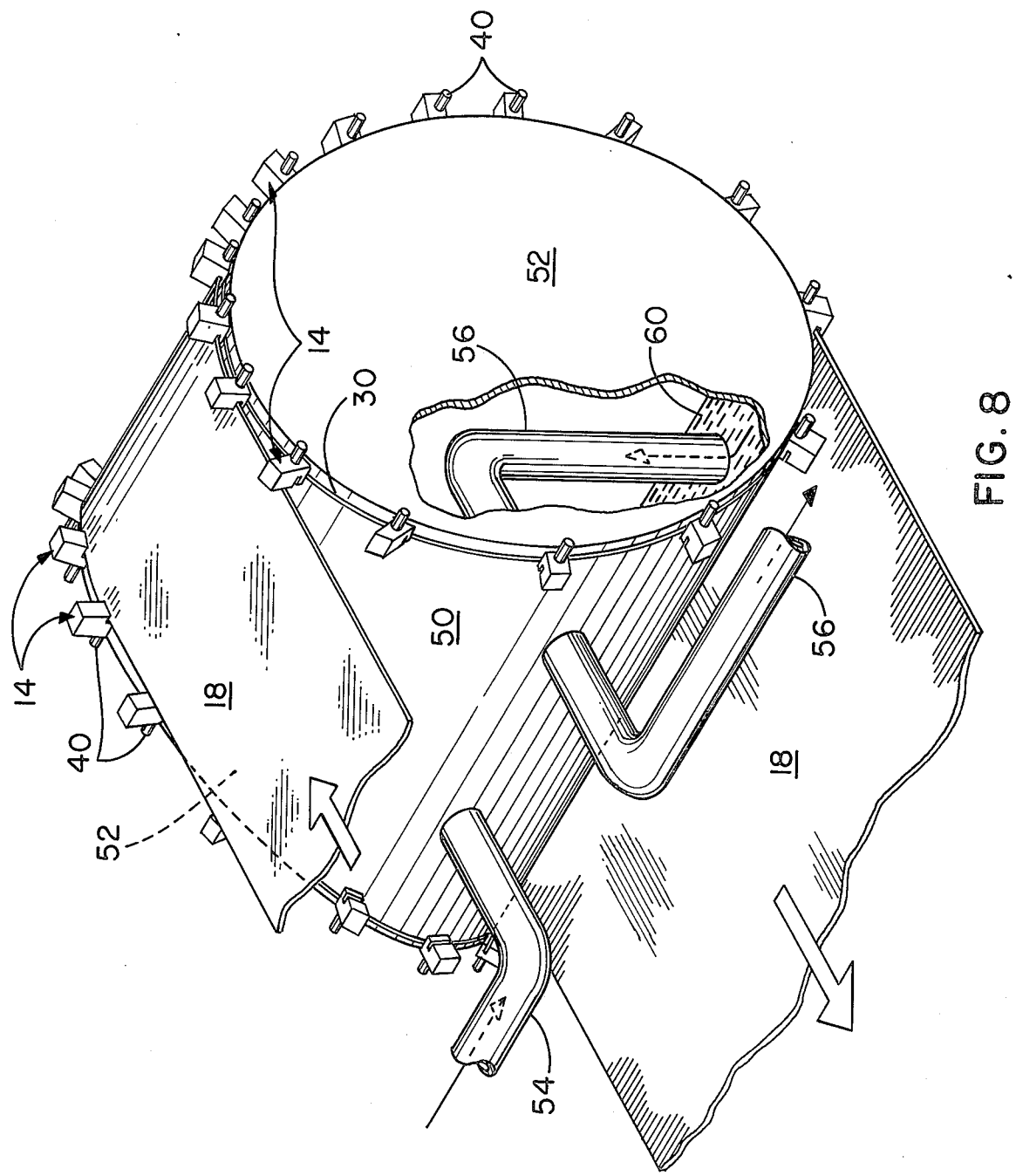
FIG. 8 is a perspective view of an alternative embodiment allowing heating or cooling of the web during stretching.

FIG. 8 illustrates schematically an alternative embodiment including provisions for heating or cooling the web during treatment. The clamp driving mechanism has been omitted for clarity. In this arrangement a hollow drum 50 supports tracks 30 and clamps 14 near its ends 52. Conduits 54 and 56 are provided for admitting and removing a suitable heat transfer fluid 60, e.g. steam or cold water. As web 18 is stretched, its contact with the drum surface provides the desired web treatment.

The present invention thus provides a unique and highly efficient apparatus for achieving simultaneous biaxial continuous stretch. It is both adjustable and relatively uncomplicated in operation. Therefore, it is apparent that there has been provided in accordance with the invention a simultaneous biaxial stretcher that fully satisfies the objects, aims and advantages set forth above. While the invention has been described in conjunction with specific embodiments thereof, it is evident that many alternatives, modifications and variations would be apparent to those skilled in the art in light of the foregoing description. Accordingly, it is intended to embrace all such alternatives, modifications and variations as fall within the spirit and broad scope of the appended claims.

I claim:

1. Apparatus for simultaneously and continuously biaxially stretching webs comprising,
   a circumferential track disposed in one plane,
   a second similar circumferential track disposed in a second plane at an angle to said first plane so that said tracks approach each other at one location and are more widely separated at the opposite location on said circumferential tracks,
   a plurality of independent clamps slidably positioned in each of said tracks for gripping said web,
   means for moving said clamps around said tracks in a circumferential path so that the clamp motion accelerates in the distance from the location where said tracks approach each other to the opposite location in said circumferential path, said moving means comprising,
   a disk located in a plane parallel to the plane of at least one of said circumferential tracks,
   a plurality of grooves extending generally radially within said disk,
   means for rotating the disk about an axis displaced from the center of the circumferential track in the parallel plane, and
   means connecting the clamps in said parallel plane with the grooves for movement therewith,
   means for feeding said web to said clamps at a location where said tracks are relatively close;
   means for forcing said clamps against said web;
   means for releasing said clamps at said opposite location; and
   means for removing said web from the clamps at a location where said tracks are more widely separated.

2. The apparatus of claim 1 wherein said means for rotating said disk comprises,
   a circumferential track on said disk,
   a drive wheel engaged with said disk circumferential track, means for rotating said drive wheel and thereby said disk.

3. The apparatus of claim 1 wherein said disk grooves have a slight s-shaped configuration.

4. The apparatus of claim 1 wherein the circumferential tracks for said clamps form the ends of an oblique enclosed, hollow cylinder, and wherein means are included for controlling the temperature of said cylinder for the purpose of treating said web during stretching.

* * * * *